United States Patent
Huang et al.

(10) Patent No.: US 6,560,380 B2
(45) Date of Patent: May 6, 2003

(54) PLANAR LIGHTWAVE CIRCUIT INTERLEAVER

(75) Inventors: Ding-Wei Huang, Taipei (TW); Tsung-Hsuan Chiu, Hsinchu Hsien (TW); Yin-Chieh Lai, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 4 days.

(21) Appl. No.: 09/887,330

(22) Filed: Jun. 25, 2001

(65) Prior Publication Data

US 2002/0159675 A1 Oct. 31, 2002

(30) Foreign Application Priority Data

Mar. 2, 2001 (TW) ........................................ 90104793 A (51) Int. Cl.[7] .............................. G02B 6/26; G02B 6/24
(52) U.S. Cl. .............................. 385/15; 385/14; 385/31; 385/39
(58) Field of Search ............................... 385/15, 37, 31, 385/39, 14

(56) References Cited

U.S. PATENT DOCUMENTS

| | | | | |
|---|---|---|---|---|
| 5,140,284 A | * | 8/1992 | Petersson et al. | 331/25 |
| 5,680,236 A | * | 10/1997 | Van Der Tol | 359/116 |
| 5,943,452 A | * | 8/1999 | Himeno et al. | 385/14 |
| 6,094,513 A | * | 7/2000 | Rigny et al. | 385/24 |

* cited by examiner

Primary Examiner—Robert H. Kim
Assistant Examiner—Richard Kim
(74) Attorney, Agent, or Firm—Birch, Stewart, Kolasch & Birch, LLP (57) ABSTRACT

Along with several few-channel and low-density wavelength division multiplexer/de-multiplexer, a novel planar lightwave circuit (PLC) interleaver is invented to achieve high-density wavelength division multiplexing and de-multiplexing in a wavelength division multiplexing fiber communication system. The invention uses a PLC as its basic structure and applies the principle that the product of the number of output optical waveguides and the channel spacing is equal to the free spectral range of the spectrum of any output optical waveguide to make a compact PLC interleaver.

4 Claims, 9 Drawing Sheets

PLANAR LIGHTWAVE CIRCUIT INTERLEAVER

BACKGROUND OF THE INVENTION

1. Field of Invention

The invention relates to an interleaver structure and, in particular, to an interleaver used in a high-density wavelength division multiplexing fiber communication systems to achieve wavelength division multiplexing and de-multiplexing.

2. Related Art

Figure 1:
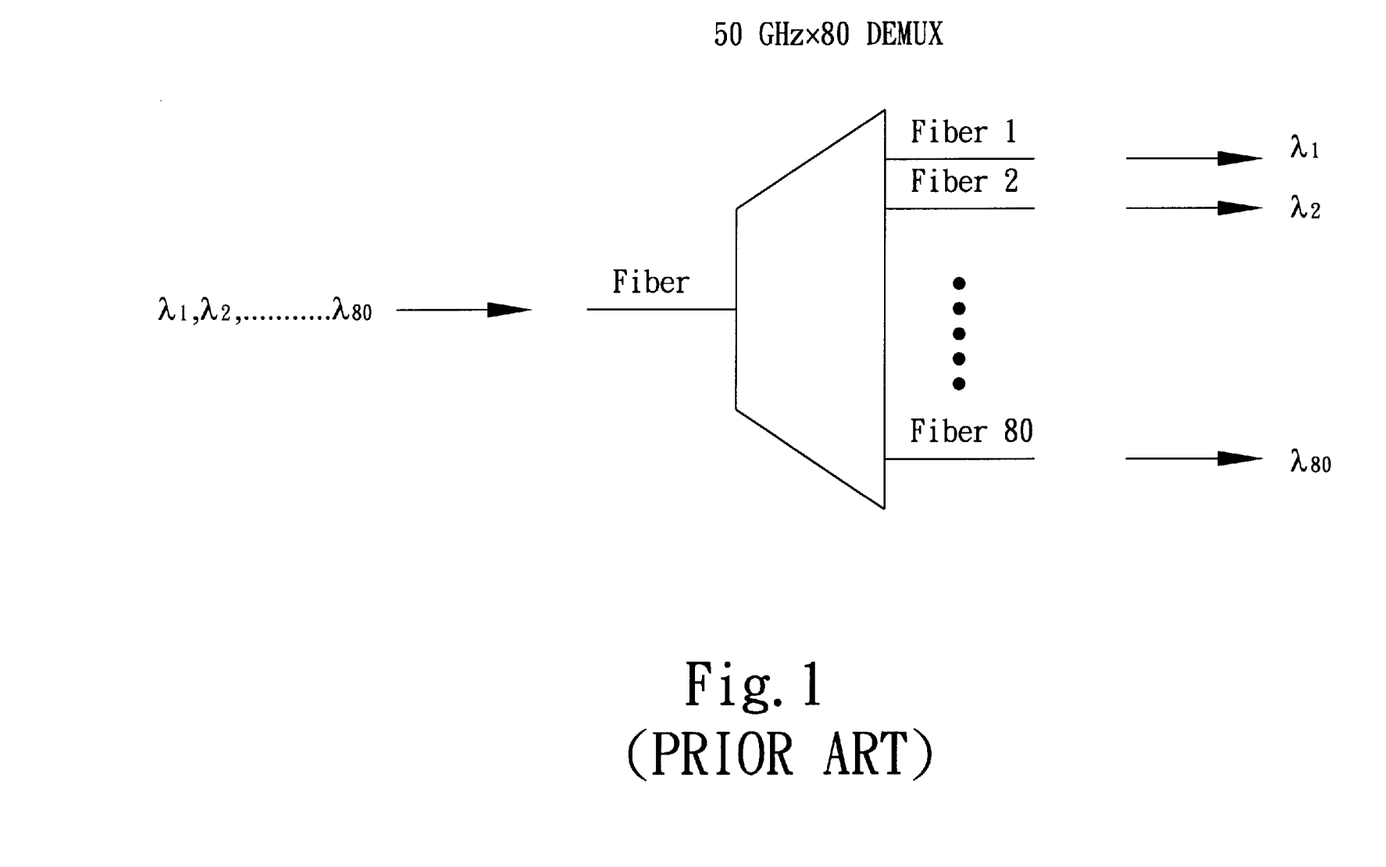
FIG. 1 shows a structure of a conventional WDM system with a channel spacing of 50 GHz.

The basic structure of a high-density wavelength division multiplexing optical fiber communication system is to divide mostly used transmission spectra in the optical fiber into several transmission channels according to the lightwave frequencies. Each channel uses its central frequency as its carrier frequency (such as ITU 100 GHz grid). The signals in all channels are merged together to be transmitted over one fiber so as to increase its transmission capacity. This is called the wavelength division multiplexing (WDM). Afterwards, the signals of all channels transmitted in the fiber are separated into different fibers to perform signal processing. This is called the wavelength division de-multiplexing (WDDM). Taking a wavelength division de-multiplexing system with a frequency interval of 50 GHz as an example (FIG. 1), there are optical signals satisfying the ITU grid 50 GHz×80 channels transmitting in the fiber. A 50 GHz×80 channels wavelength division de-multiplexer (DEMUX) can de-multiplex the signal light of all wavelength channels so that the signal of each channel is guided into a distinct fiber.

Figure 2:
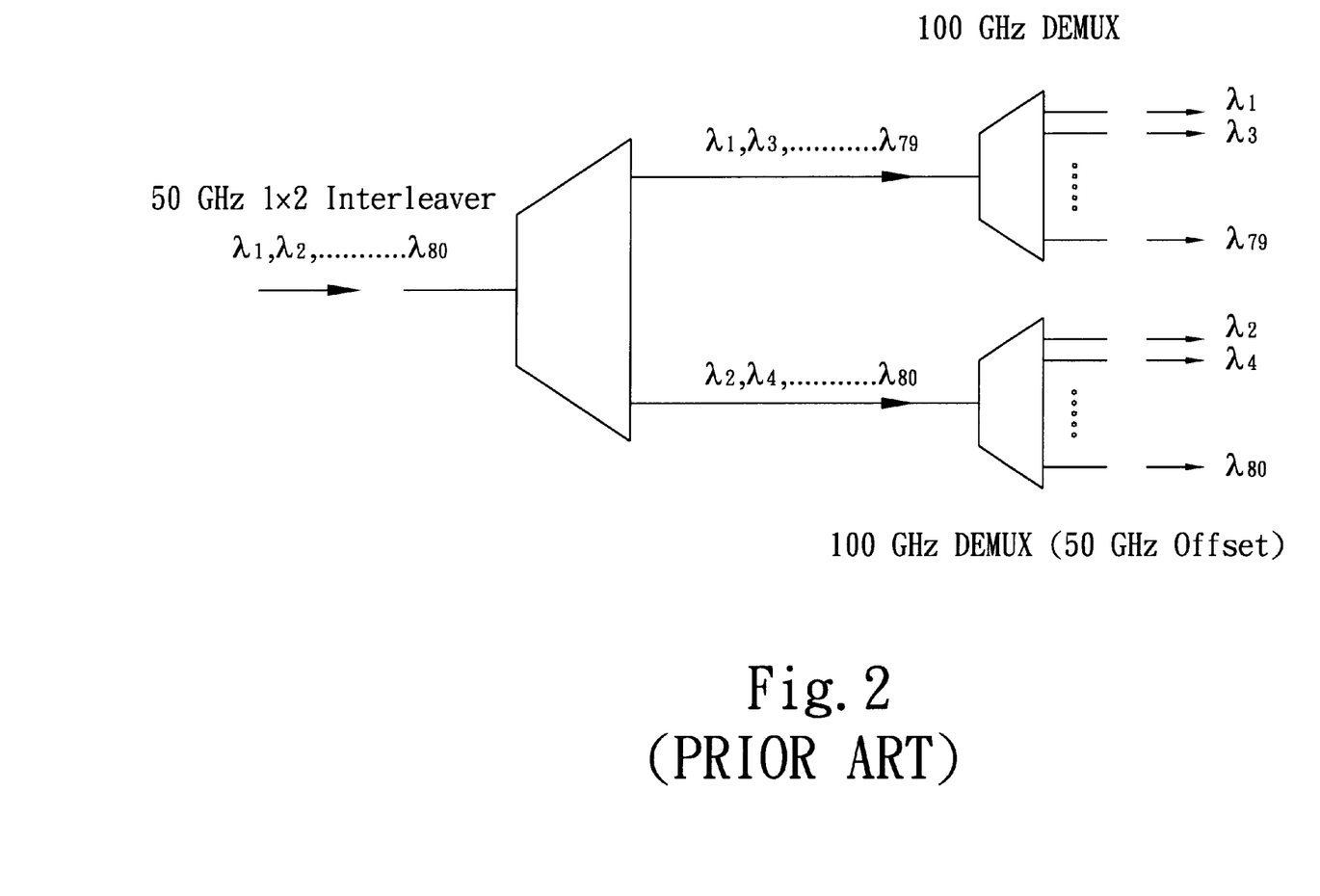
FIG. 2 shows a structure of an interleaver accompanied with two few-channel and low-density channel spacing multi-channel de-multiplexing system in the prior art.

Alternatively, an interleaver can be equipped with two few-channel and low-density channel spacing multi-channel de-multiplexer to achieve the same object (FIG. 2). Similarly, optical signals satisfying the ITU Grid 50 GHz×80 channels are transmitted therein. In this case, a 50 GHz 1×2 interleaver can be used to perform the first stage de-multiplexing on the signal light. According to the functioning principles of interleavers, optical signals in 40 odd channels are output from one of the output terminal. Such optical signals satisfy the ITU Grid 100 GHz wavelength channel standard. Meanwhile, optical signals of the other 40 even channels are output from another output terminal. Such optical signals satisfy the ITU Grid 100 GHz wavelength channel standard with a channel offset of 50 GHz. Both of the optical signals can be de-multiplexed using 100 GHz multi-channel de-multiplexers (one of them having an offset of 50GHz) so that the optical signals of each channel are transmitted into distinct optical fibers.

Although the above two methods perform the same function, the later has a lower cost because the manufacturing of the 50 GHz×80 channels DEMUXs is much harder than that of the 100 GHz×40 channels DEMUXs. Also, the channel number of a single device is twice that of a 100GHz one, therefore the cost is often several times more expensive than that of two 100 GHz DEMUXs. Thus, using the structure in FIG. 2 costs much less than that of FIG. 1 even if an additional interleaver is included.

From the viewpoint of system upgrading, interleavers are indispensable. Suppose a 100 GHz×40 channels DEMUX transmission system needs to be upgraded into a 50 GHz×80 channels DEMUX system to double the transmission capacity. If one considers to upgrade it to the structure shown in FIG. 1, the original 100 GHz DEMUX has to be replaced by a 50 GHz×80 channels DEMUX. Besides the cost increases, the abandoned device is also a waste of cost. If one wants to upgrade it into the structure shown in FIG. 2, the 100 GHz DEMUX can be kept. One only needs to add another 100 GHz DEMUX (with an offset of 50GHz) and an interleaver. It does not increase or waste extra cost.

SUMMARY OF THE INVENTION

An object of the invention is to provide a planar lightwave circuit (PLC) interleaver that mainly utilizes a PLC structure.

Along with several few-channel and low-density wavelength division multiplexer/de-multiplexer, a novel planar lightwave circuit (PLC) interleaver is invented to achieve high-density wavelength division multiplexing and de-multiplexing in a wavelength division multiplexing fiber communication system.

The invention uses a PLC structure as its technical basis. Utilizing the principle that the product of the number of output optical waveguides and the channel spacing is equal to the free spectral range of any output optical waveguide spectrum, a PLC interleaver structure is designed to, along with several few-channel and low-density wavelength division multiplexer/de-multiplexer, construct a high-density WDM fiber communication system.

The disclosed PLC interleaver can be integrated with other PLC wavelength division multiplexers/de-multiplexers or other complicated PLC devices on the same chip through the PLC manufacturing techniques. The product does not only feature in small volume but is also convenient for mass production at a lower cost.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 3:
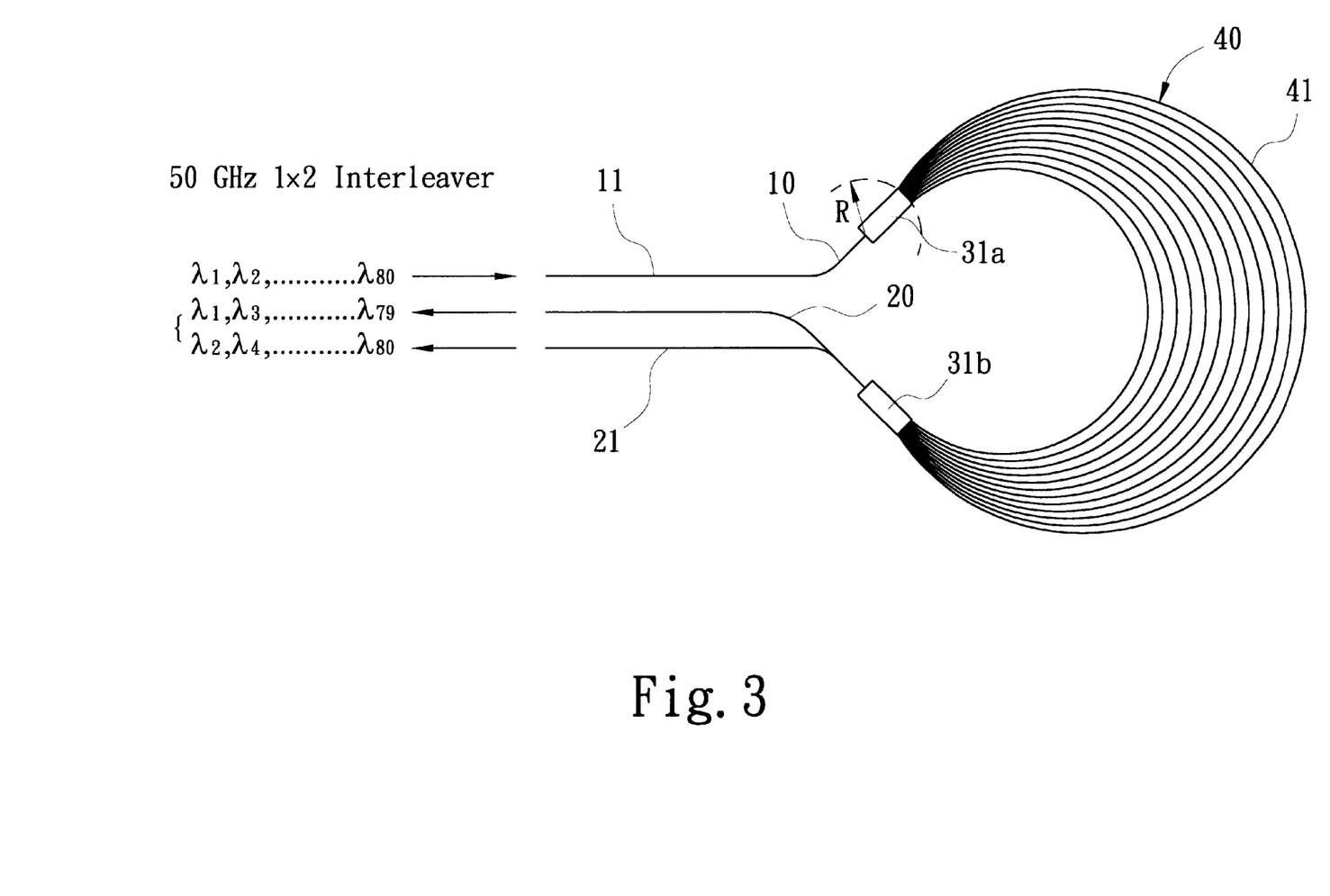
FIG. 3 shows a structure of the disclosed interleaver.

With reference to FIG. 3, the disclosed PLC interleaver is a PLC device with an arrayed waveguide grating (AWG) structure. It has the typical wavelength division multiplexing (WDM) characteristics of the AWG. The interleaver contains:

an optical waveguide input terminal 10 that can connect to an input fiber transmitting input signals;

several optical waveguide output terminals 20 connecting to output fibers 21 transmitting output signals;

a free propagation region (FPR) that contains a first FPR 31a and a second FPR 31b; and an arrayed waveguide (AW) with several branches 41 whose ends are located in the two FPRs 31a, 31b through which the branches 41 connect to the optical waveguide input terminal 10 and the optical waveguide output terminals 20.

Both ends of each branch 41 of the arrayed waveguide 40 are located on the circles centered at the optical waveguide input terminal 10 and the optical waveguide output terminal 20. The optical waveguide input terminal 10 and the optical waveguide output terminal 20 can be located either on the same side or opposite sides of the PLC interleaver.

When an input optical signal enters the optical waveguide input terminal 10 through an input fiber 11, the optical signal spreads into the branches 41 of the arrayed waveguide 40 through the propagation of the first FPR 31a. If adjacent branches are designed to have a fixed optical path difference, after the optical signals propagate through the array waveguide to the other end of the branches 41 and enter the optical waveguide output terminals 20 through the propagation of the second FPR 31b, the wavefronts of the output optical signals are different corresponding to different optical paths. This effect makes optical signals with different wavelengths output through different optical waveguide output terminals 20, providing necessary filtering effects on output optical waveguide spectra. This is the so-called wavelength division de-multiplexing (WDDM). This property is often used to make the multiplexer/de-multiplexer (MUX/DEMUX) in a WDM system.

Since the AWG uses discrete positions to process optical signals separately and then recombine them, the filtering character at the optical waveguide output terminals 20 gives a periodic curve in the spectrum. The period is called the free spectral range (FSR). Therefore, a main technique used in the invention is to take the AWG device as the basis. So that, through a proper design, the FSR is exactly equal to the product of the number of the optical waveguide output terminals 20 and the channel spacing. This renders the AWG device the properties of an interleaver.

Figure 4:
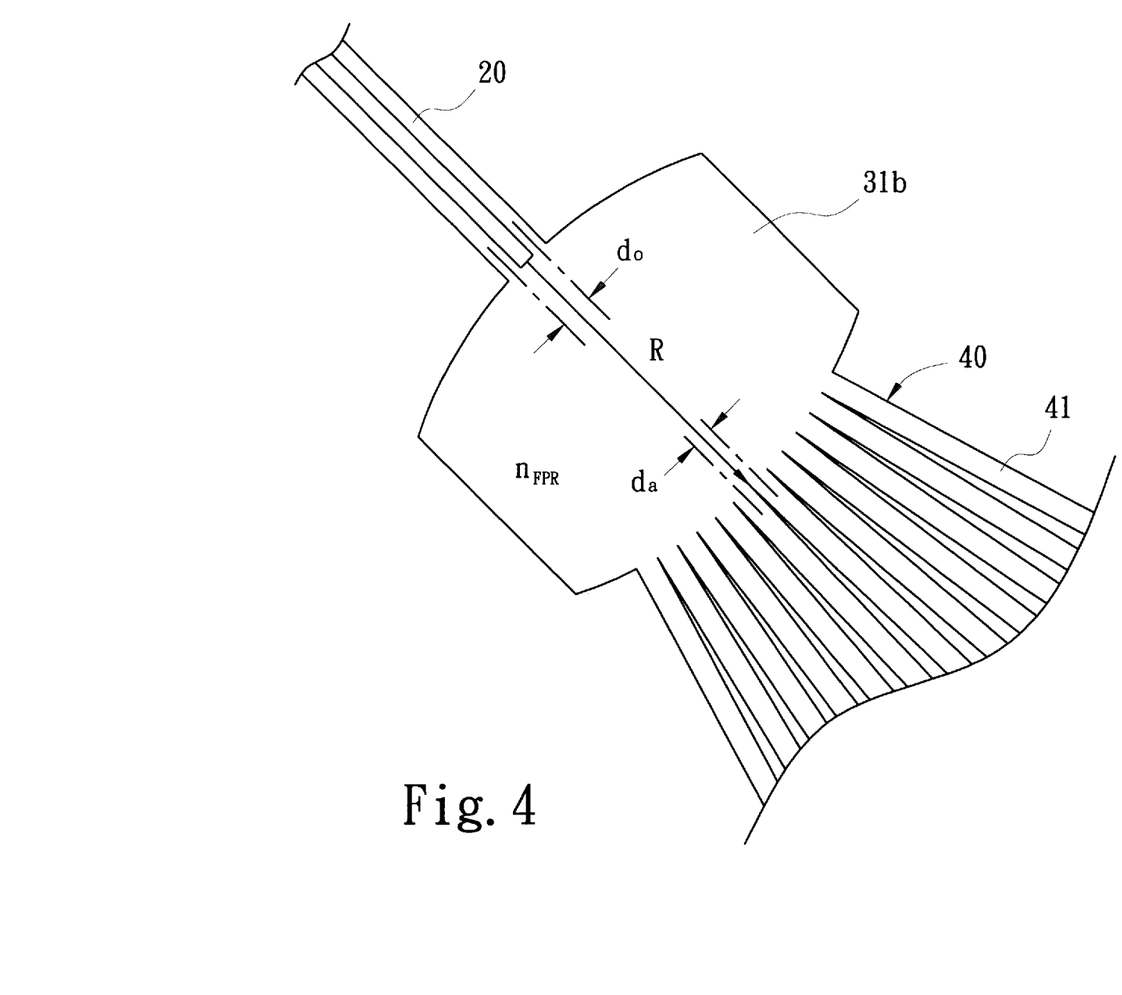
FIG. 4 illustrates a local structure of the invention, showing a free propagation region, locations of branches in an arrayed waveguide, and the relations between any two neighboring waveguide output terminals.

With reference to the AWG device shown in FIG. 3, suppose the optical path difference between two branches 41 of the arrayed waveguide (AW) 40 in the AWG device is $\Delta p$, then the FSR can be obtained from the following equation:

$$\Delta f_{FSR} = c/\Delta p, \quad (1)$$

Where c is the speed of light in vacuum. The channel spacing depends upon the size of the second FPR 31b and the location of the output optical waveguide. Suppose the second FPR 31b has a refraction index of $n_{FPR}$ and a radius of R. Denote the distance between any two branches 41 of the AW 40 in the second FPR 31b by $d_a$, the distance between any two optical waveguide output terminals 20 by $d_o$ (FIG. 4), and the central frequency of the optical signal by $f_c$. Then the channel spacing $\Delta f_{ch}$ is expressed by:

$$\Delta f_{ch} = \frac{n_{FPR} \cdot d_a \cdot d_o}{R \cdot \Delta p} \cdot f_c. \quad (2)$$

If it is used as an interleaver, then the following equation must hold:

$$\Delta f_{FSR} = N_{out} \cdot \Delta f_{ch}, \quad (3)$$

Where $N_{out}$ is the number of the optical waveguide output terminals 20 (i.e. the number of output optical waveguides).

In other words, when the central wavelength $\lambda_c = c/f_c$, the channel spacing $\Delta f_{ch}$, and the number of the optical waveguide output terminals 20 are known, one can use Eq. (3) to design the radius R of the FPR (both the first and the second FPRs have the same radius R), the distance $d_a$ between any two branches of the AW 40, and the distance $d_o$ between any two optical waveguide output terminals 20. When the above requirements are satisfied, an interleaver with the desired optical output spectral properties can be constructed.

Figure 5:
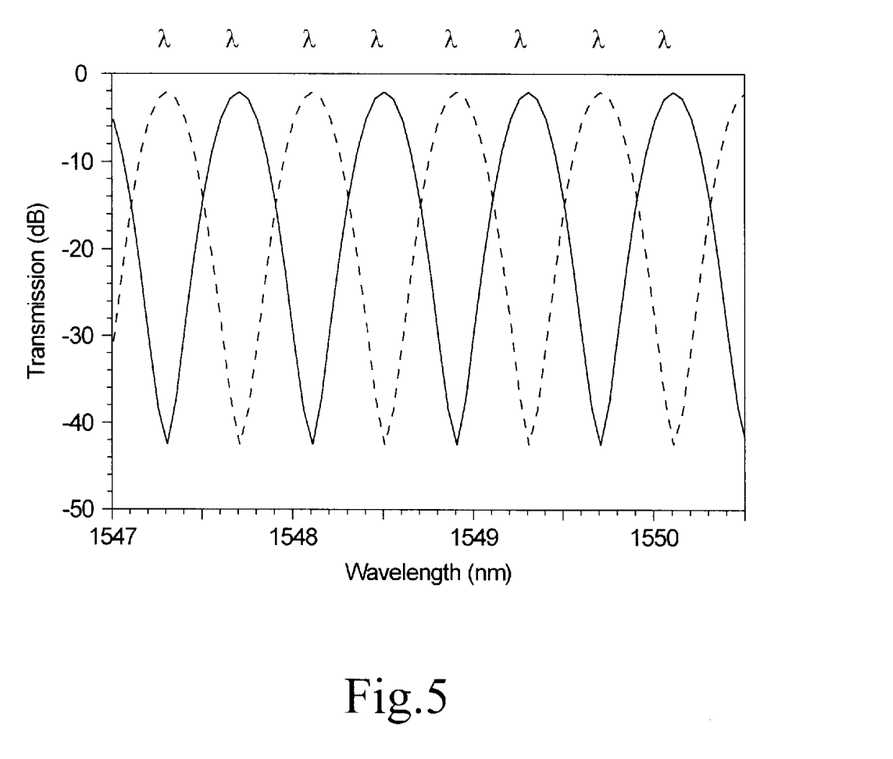
FIG. 5 is an output spectrum diagram of the interleaver, demonstrating one example of the invention.

For example, FIG. 5 shows the spectra of PLC interleaver with two output waveguide terminals 20, which is constructed using the above-mentioned techniques. The central wavelength is 1548.51 nm (193.6 THz), and the channel spacing is 0.4 nm (50 GHz). In the design, the FSR 0.8 nm (100 GHz) is exactly equal to the product of the number of the optical waveguide output terminals 20 (output optical waveguides) and the channel spacing. In the drawing, the solid curve and the dashed curve are the optical waveguide output spectra of the two optical waveguide output terminals 20. The maximum of the solid curve matches the wavelength of the ITU 100 GHz DWDM Grid, while the maximum of the dashed curve matches the wavelength of the ITU 100 GHz Grid shifted by 50 GHz. Therefore, it satisfies the spectral properties of the desired interleaver.

Figure 6:
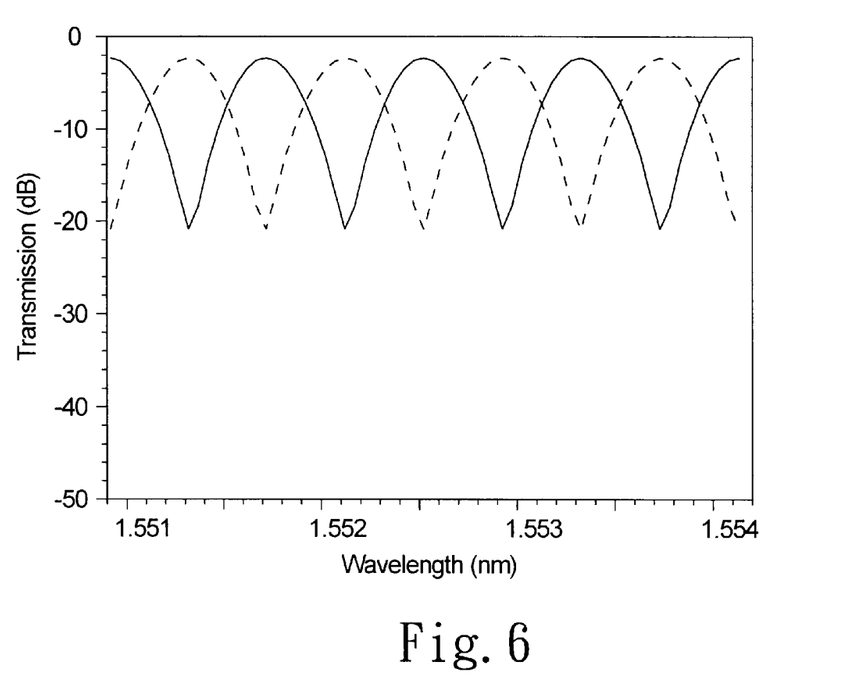
FIGS. 6–8 show the output spectra of three interleavers with different geometries.
Figure 7:
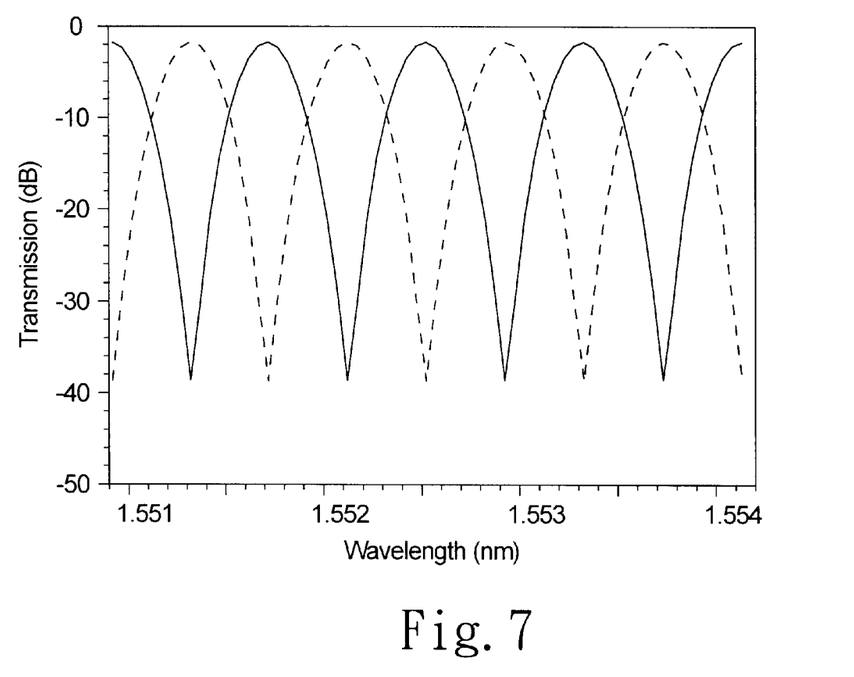
Figure 8:
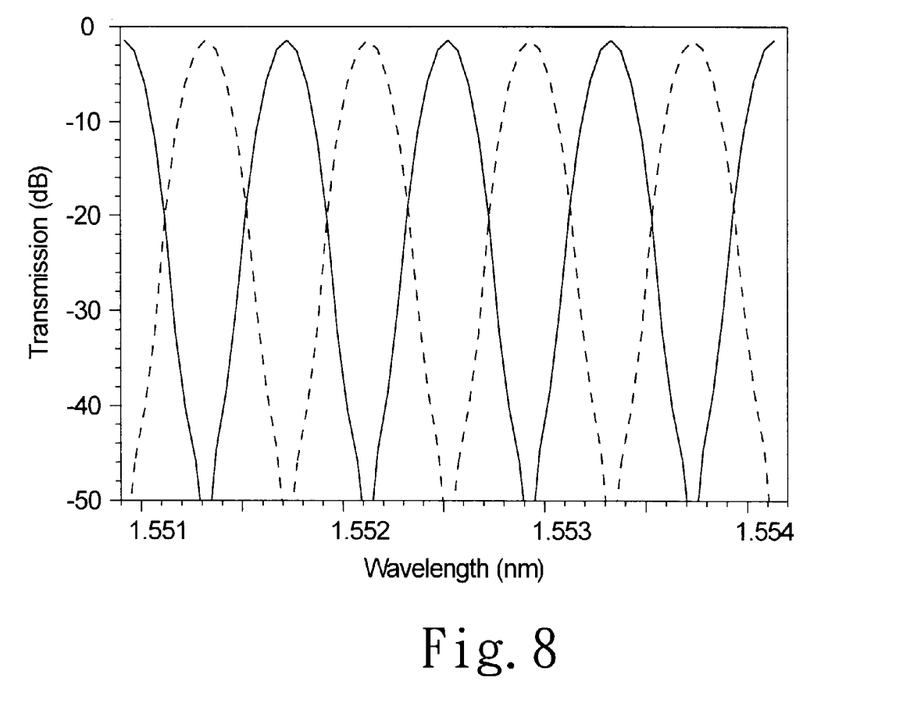

FIGS. 6 through 8 are the output spectra of a 50 GHz 1×2 interleaver for other embodiment of the invention, where the solid and dashed curves represent the output spectra of two output optical waveguides, respectively. In FIGS. 6 through 8, the value of the distance $d_o$ between any two adjacent optical waveguide output terminals 20 are different ($d_o = 10$ $\mu$m in FIG. 6, $d_o = 14$ $\mu$m in FIG. 7, and $d_o = 20$ $\mu$m in FIG. 8) and the value of the radius R in the FPR 30 are changed correspondently, while keeping the ratio $d_o/R$ invariant. The central frequency and the channel spacing of the spectra do not vary, but the cross-talk between channels decrease as $d_o$ increases (−18 dB, −36 dB, −50 dB, respectively). Therefore, the two design parameters do and R of the interleaver can be changed to obtain a desired cross-talk between channels.

Figure 9:
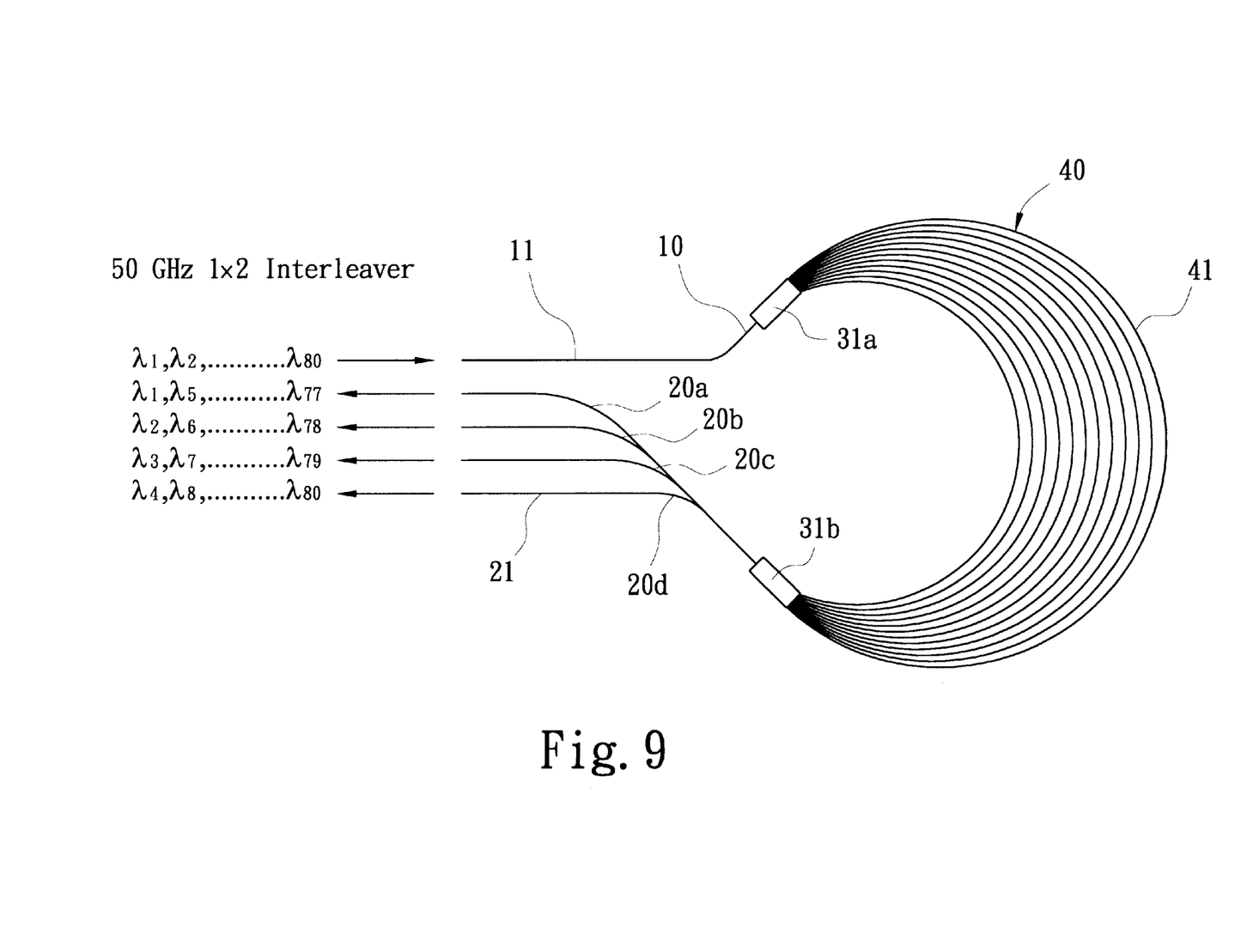
FIG. 9 shows a structure of a 50 GHz 1×4 interleaver of the invention.
Figure 10:
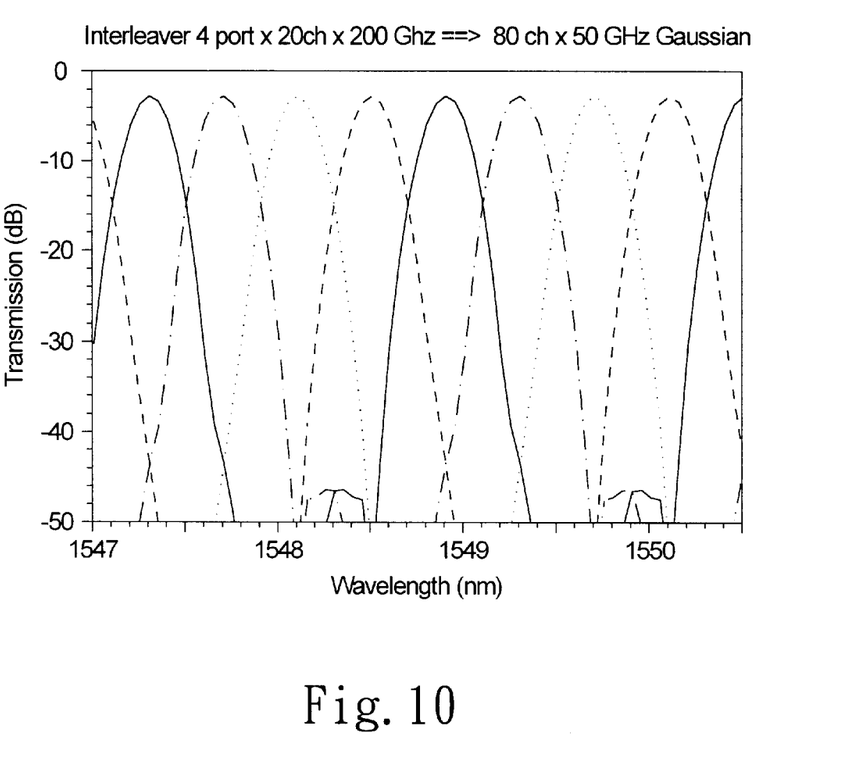
FIG. 10 is an output spectrum diagram of FIG. 9.

Finally, it should be emphasized that the interleavers in the prior art are limited to the 1×2 type. However, using the techniques disclosed herein, one does not have such a limitation. Interleavers of the 1 ×N type can be designed, where N is the number of output optical waveguides (i.e. the number of the optical waveguide output terminals 20) and N can be greater than 2. As an example shown in FIG. 9, the 50 GHz 1×4 interleaver contains an optical waveguide input terminal 10 and four optical waveguide output terminals 20a through 20d. According to the principle that the product of the output optical waveguide number and the channel spacing is equal to the FSR of the spectrum of any output optical waveguide, one can determine the structure and size of the interleaver. The spectra of the four output optical waveguides are indicated by the solid, dashed, dotted, and dash-dotted curves in FIG. 10, respectively.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A planar lightwave circuit (PLC) interleaver for distributing optical signals from an input fiber to several output fibers according to the frequency spacing of the optical signals, which comprises:

an optical waveguide input terminal connection to the input fiber that transmits the input optical signals;

a plurality of optical waveguide output terminals connecting to the output fibers that transmit the output optical signals;

a free propagation region (FPR) with a first FPR and a second FPR; and an arrayed waveguide (AW) having a plurality of branches whose both ends are located on the circles centered at the optical waveguide input terminal and the optical waveguide output terminal;

wherein said optical waveguide input terminal and said AW are connected by said first FPR, and said optical waveguide output terminal and said AW are connected by said second FPR;

wherein the product of the number of the optical waveguide output terminals and the channel spacing is equal to the free spectral range (FSR) of the spectrum of any output optical waveguide; and wherein the FSR $\Delta f_{FSR}$ is determined according to the following formula:

$$\Delta f_{FSR} = c/\Delta p$$

where c is the speed of light in vacuum and $\Delta p$ is the optical path difference between the adjacent branches of the AW.

2. The planar lightwave circuit (PLC) interleaver of claim 1, wherein the optical waveguide input terminal and the plurality of optical waveguide output terminals are located on the same side of the interleaver.

3. The planar lightwave circuit (PLC) interleaver of claim 1, wherein the optical waveguide input terminal and the plurality of optical waveguide output terminals are located on opposite sides of the interleaver.

4. The planar lightwave circuit (PLC) interleaver of claim 1, wherein the channel spacing $\Delta f_{ch}$ is determined according to the following formula:

$$\Delta f_{ch} = \frac{n_{FPR} \cdot d_a \cdot d_o}{R \cdot \Delta p} \cdot f_c,$$

where $n_{FPR}$ is the refraction index of the FPR, R is the radius of the FPR, $d_a$ is the distance between any two of the branches of the AW, $d_o$ is the distance between any two of the optical waveguide output terminals, $f_c$ is the central frequency of the optical signals, and $\Delta p$ is the optical path difference between the adjacent branches of the AW.

* * * * *